(12) United States Patent
Andersson

(10) Patent No.: US 6,428,106 B1
(45) Date of Patent: Aug. 6, 2002

(54) GUIDE MEANS FOR FLEXIBLE ELEMENTS

(75) Inventor: Peter Andersson, Bridgend (GB)

(73) Assignee: Youngflex AG, Zug (CH)

( * ) Notice: Subject to any disclaimer, the term of this patent is extended or adjusted under 35 U.S.C. 154(b) by 0 days.

(21) Appl. No.: 09/462,650

(22) PCT Filed: Jul. 10, 1998

(86) PCT No.: PCT/GB98/02034

§ 371 (c)(1),
(2), (4) Date: Mar. 28, 2000

(87) PCT Pub. No.: WO99/02368

PCT Pub. Date: Jan. 21, 1999

(30) Foreign Application Priority Data

Jul. 11, 1997 (GB) .............................. 9714688

(51) Int. Cl.[7] .............................................. A47C 31/00
(52) U.S. Cl. ........................................ 297/483; 297/391
(58) Field of Search .................. 297/483, 484, 297/452.18, 452.2, 391

(56) References Cited

U.S. PATENT DOCUMENTS

| | | | | |
|---|---|---|---|---|
| 4,652,053 A | * | 3/1987 | Mikami | 297/483 X |
| 4,893,835 A | * | 1/1990 | Linden | 297/483 X |
| 5,246,271 A | * | 9/1993 | Boisset | 297/483 X |
| 5,445,434 A | * | 8/1995 | Kohut | 297/391 |
| 5,667,276 A | * | 9/1997 | Connelly et al. | 297/391 X |
| 5,788,250 A | * | 8/1998 | Masters et al. | 297/391 X |
| 5,927,813 A | * | 7/1999 | Nemoto | 297/391 |
| 6,074,010 A | * | 6/2000 | Takeda | 297/391 |
| 6,113,135 A | * | 9/2000 | Tsutsumi | 297/483 X |

* cited by examiner

Primary Examiner—Peter M. Cuomo
Assistant Examiner—Stephen Vu
(74) Attorney, Agent, or Firm—Wood, Herron & Evans, L.L.P.

(57) ABSTRACT

A guide assembly for guiding a flexible element such as a seat belt relatively to a support such as a seat frame (1), comprises a mounting member (3) having an aperture for receiving an escutcheon member (4) for trimming an orifice through which the element is to pass. The mounting (3) and escutcheon member (4) are divided to enable lateral insertion of the flexible element therein, and the mounting (3) holds the divided escutcheon member together when the latter is inserted therein. The assembly may be supplemented by a divided guide conduit (5).

10 Claims, 3 Drawing Sheets

GUIDE MEANS FOR FLEXIBLE ELEMENTS

FIELD OF THE INVENTION

This invention concerns an improved guide means for a flexible element.

BACKGROUND OF THE INVENTION

There is often a requirement for a versatile means of guiding a flexible element via an indirect path whilst ensuring that the element is adequately protected from snagging or catching on adjacent members. Ideally the element should also be concealed from view by any such guide means in an elegant manner.

A particular example of such a requirement can be found in the context of a vehicle seat for a passenger vehicle such as a minibus, where, unlike the automobile, the seat belt cannot be mounted to a pillar forming a structural member of the vehicle body. In this case the seat belt must be supported from the seat frame itself and there is a need to guide a retractable seat belt through the seat from the shoulder level of the occupant to a seat belt mounting which is generally located at floor level behind the seat. If the seat belt is to be adequately protected from snagging over the path from the shoulder of the occupant of the seat to the anchorage of the reel mechanism for storage of the belt the seat must be provided with a suitable guide means for containing the belt. This has hitherto proved difficult to achieve in a construction that is both elegant and which allows the belt to be guided through the upholstery of the seat in such a manner that replacement of the seat belt mechanism can be effected when necessary without major reconstruction of the seat.

There are other requirements for the guidance of flexible members such as actuating cables where it may be necessary to insert the flexible member through a guide means the cross-section of the effective guide passage of which is smaller than the dimension of fittings attached to the flexible member. The arrangement according to the invention, although described below in the context of a seat belt fitting, should therefore be understood as having more general application.

SUMMARY OF THE INVENTION

According to one aspect of the invention there is provided a guide assembly for a flexible element comprising a mounting member providing an aperture extending along an axis, said mounting member being adapted to be supported from a structural member with respect to which the flexible element is to be guided, and an escutcheon means for trimming an orifice through which the flexible member is to pass, the escutcheon means being adapted to be received and retained in the said aperture of the mounting member to provide a guide aperture for the flexible member extending coaxially with the aperture in the mounting member, the mounting member being divided in such a manner that the said flexible element can be inserted into the aperture therein, in a direction transversely to said axis, the escutcheon means also being divided for insertion of the flexible member therein when disassembled from the mounting member, and the arrangement being such that surfaces defining the division in the escutcheon means are held in engagement with one another when the escutcheon means is received in the said aperture of the mounting member.

Advantageously the guide assembly further includes a divided conduit means into which the flexible member can also be inserted transversely to an elongate passage extending through the conduit means. Such a conduit means may be mounted with its elongate axis at an angle, for example a right angle to the said axis of the mounting member so that the flexible member can be guided along an angular path.

When the guide assembly is to guide the web of a seat belt the said apertures and passageway will be of rectangular cross-section, but other configurations may be adopted in accordance with the cross-section of the element to be guided.

Conveniently the mounting member may be formed of pressed sheet metal, whereas the escutcheon member may be moulded from one or more portions of synthetic plastics material, and the conduit means may be formed from one or more sections of extruded synthetic plastics material.

Further preferred features and advantages of the invention will become apparent from the accompanying drawings, in which:

DETAILED DESCRIPTION OF THE INVENTION

Figure 1:
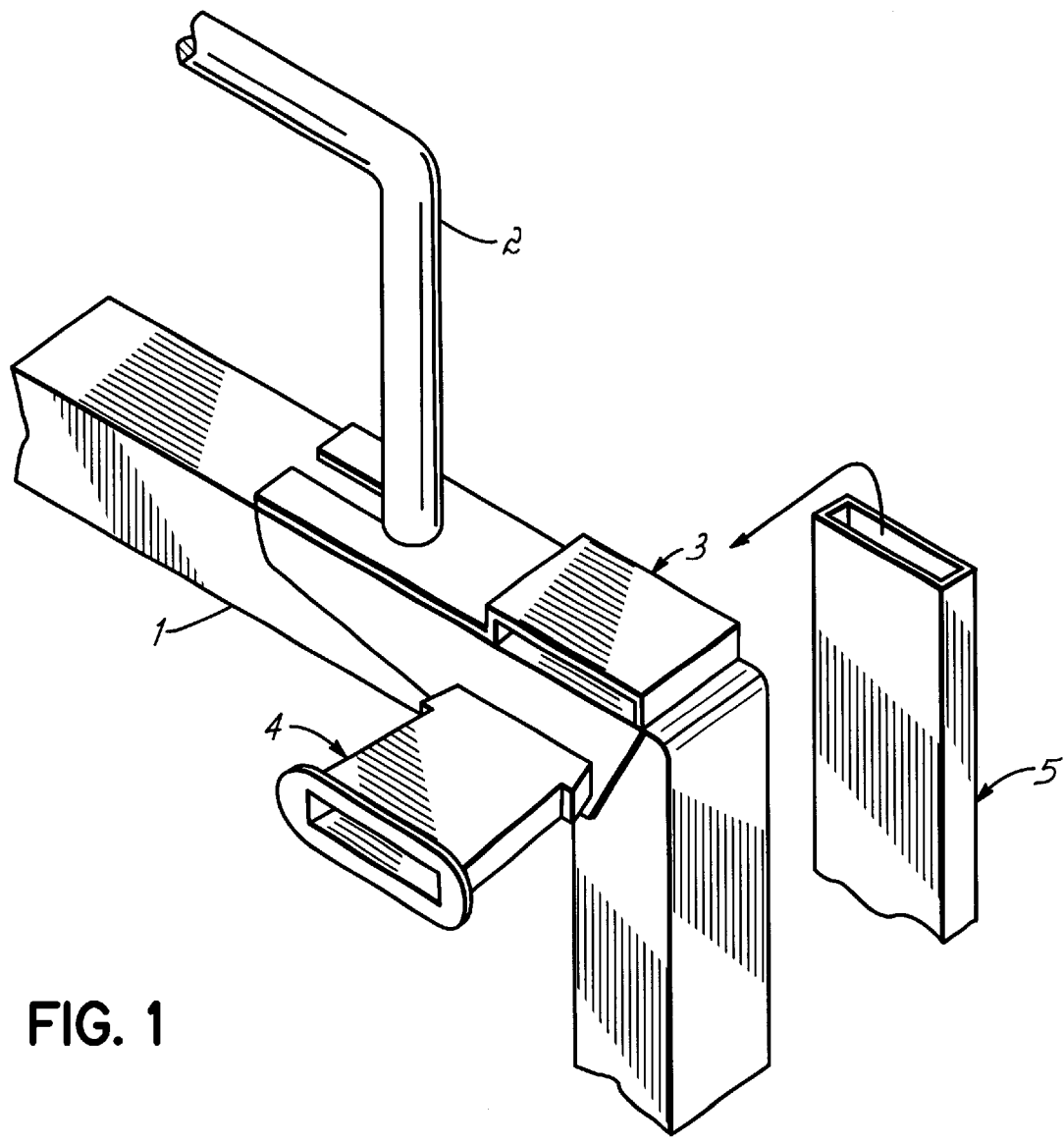
FIG. 1 is an exploded diagrammatic perspective view of a guide assembly according to the invention applied to the seat frame of a seat for a passenger vehicle such as a minibus.
Figure 2:
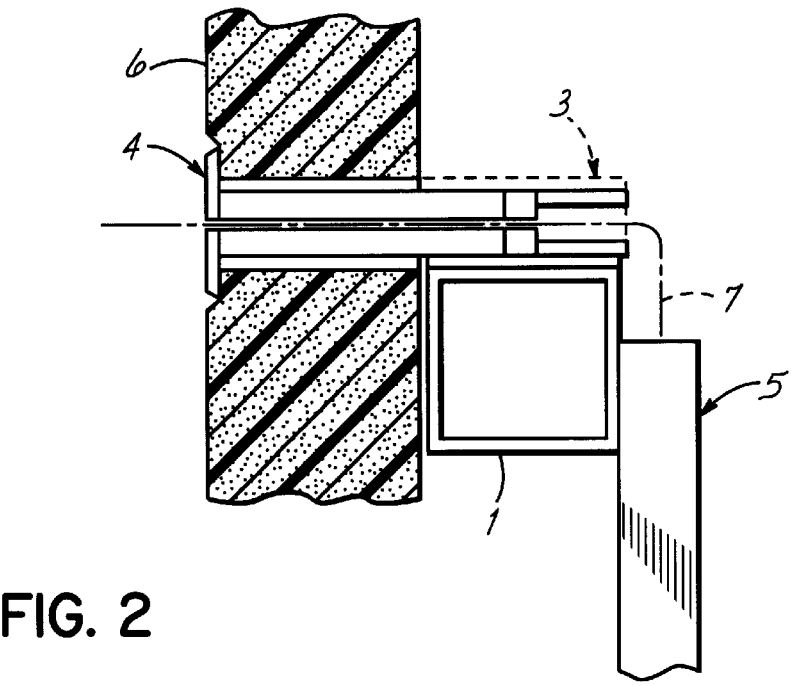
FIG. 2 is a fragmentary vertical section of a vehicle seat incorporating the assembly of FIG. 1.

Referring to FIGS. 1 and 2 of the drawings a vehicle seat comprises a frame member 1 of rectangular section steel tube that provides a back rest of the seat that is arranged to support the upholstery of the seat in known manner. Also in known manner the frame 1 supports a head rest member 2 of inverted U-shape configuration formed for example of steel rod fastened through the frame member 1 in a manner not illustrated, by way of nuts engaging bolts welded at the ends of member 2.

Figure 3:
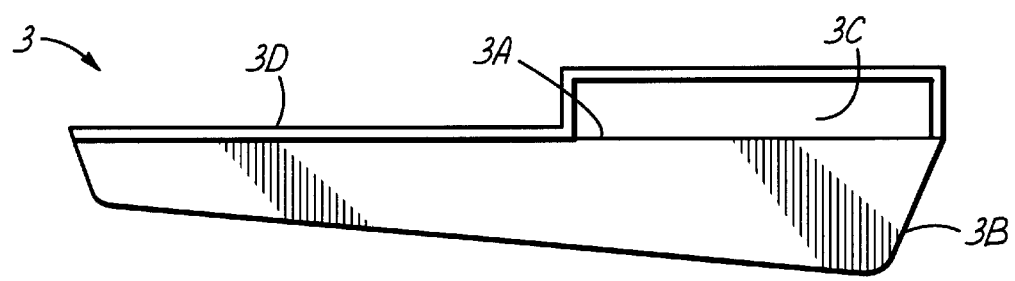
FIG. 3 is a front view of a mounting member of the assembly of FIGS. 1 and 2.
Figure 4:
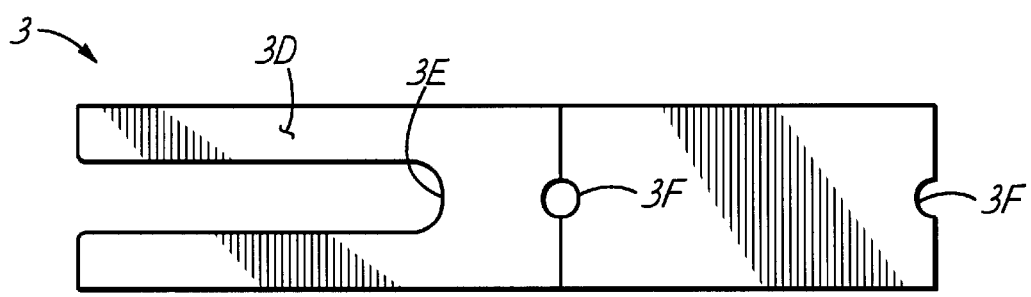
FIG. 4 is a plan view of the member of FIG. 3.
Figure 5:
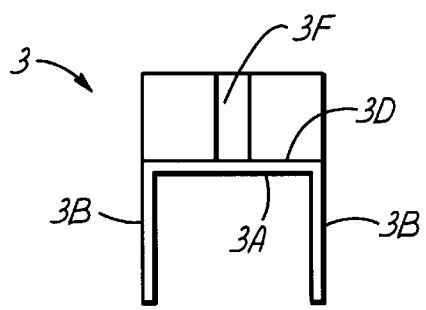
FIG. 5 is an end view of the member in the direction of the arrow A of FIG. 4.

The seat frame 1 supports a mounting member 3 (FIGS. 3 to 5) formed of folded sheet metal that defines a base portion 3A engaging over the frame member 1 a pair of downwardly extending flanges 3B locating over the vertical sides of the frame member 1, a folded portion forming a rectangular aperture 3C located at one end of the base portion 3A and a closing strip 3D extending from the aperture 3C to the other end of the base portion 3A. The base portion 3A and the closing strip 3D have registering open ended slots 3E that enable them to be slid into engagement with the member 2 and clamped in place thereby when the latter is secured to the frame member 1. The vertical sides of the aperture 3C have notched openings 3F referred to below.

Figure 6:
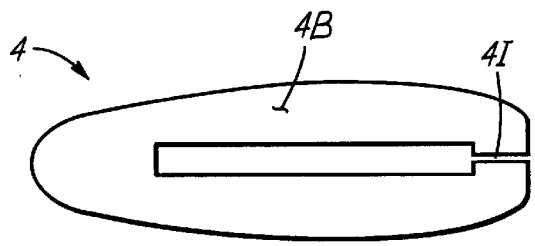
FIG. 6 is a front view of an escutcheon member of the assembly of FIGS. 1 and 2.
Figure 7:
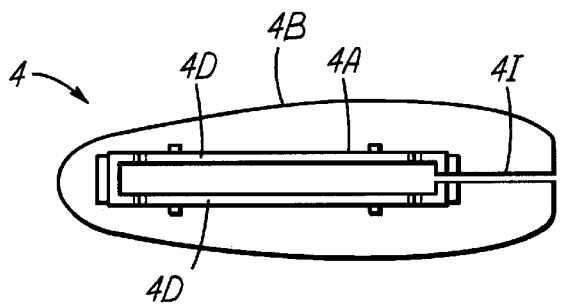
FIG. 7 is a rear view corresponding to FIG. 6.
Figure 8:
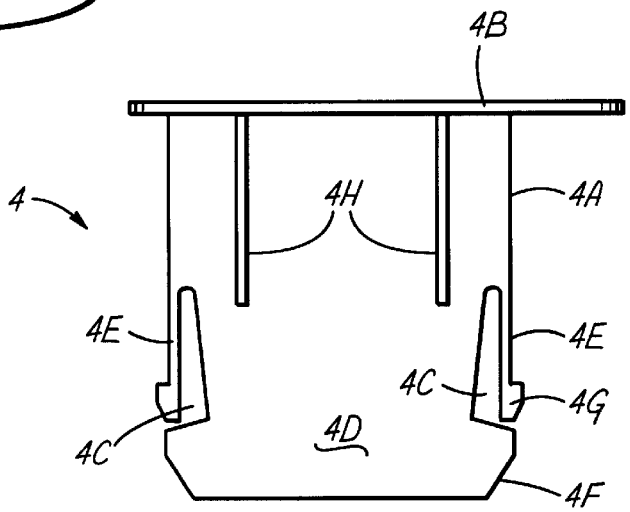
FIG. 8 is a plan view corresponding to FIG. 6.

An escutcheon member 4 (see FIGS. 6 to 8) is formed of moulded plastics material and comprises a guide portion 4A of hollow rectangular transverse section, around a front edge of which is formed an integral flange 4B having the configuration shown in FIG. 6. The hollow rectangular portion 4A has, in the region of the end remote from the flange 4B, vertically extending L-shaped openings 4C that divide the rectangular section vertically so that the portion 4A extends to provide independent upper and lower horizontal wall portions 4D and laterally opposed vertical wall portions 4E. The free ends of the wall portions 4D are chamfered at 4F, whereas the vertical wall portions 4E end in externally projecting barbs 4G. The upper and lower horizontal walls of the portion 4A are provided, in the region adjacent the flange 4B, with externally projecting ridges 4H. Furthermore, as shown more clearly in FIGS. 6 and 7, the flange 4B and one of the vertical walls 4E extending therefrom are divided horizontally by means of a slot 4I.

Figure 9:
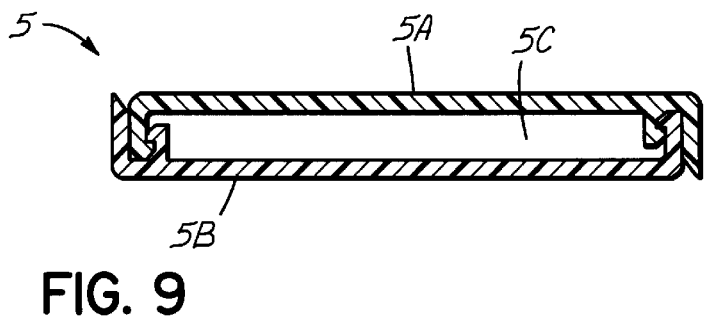
FIG. 9 is a cross-sectional view of a conduit member of the assembly of FIGS. 1 and 2.

At the rear of the seat frame 1 there is mounted a vertically extending conduit 5 of generally rectangular cross-section. As shown more clearly in FIG. 9, the conduit 5 is formed of two identical sections of extruded synthetic plastics material 5A, 5B each of which has identical longitudinally extending male and female sections that snap together as shown in FIG. 9 to provide an enclosed longitudinal passage 5C.

The guide assembly described above serves to guide the web of a seat belt from a real assembly mounted at floor level to the rear of the seat frame 1, vertically upwards behind the back of the seat, and then through the upholstery of the seat to a point at shoulder level from which it can extend to be worn by a passenger in the conventional manner. To this end, one of the two sections of the conduit 5 is secured to the rear of the seat frame 1 in the position shown in FIG. 2, and the two sections of the conduit are assembled around the webbing of the seat belt and snapped together to provide an enclosed channel extending from the seat belt rear mounting to the region of the upper edge of the frame 1.

The mounting member 3 is assembled around the seat belt webbing by passing the webbing between the base portion 3A and the closing strip 3D, and the mounting member 3 is then assembled to the top of the frame member 1 by engaging the flanges 3B around the frame and passing the slots 3E around a mounting bolt of the member 2 so that the latter serves to hold the member 3 in place on the frame member 1 when secured.

It will be appreciated that in use the frame member 1 and the head rest member 2 will be enclosed in foam material providing support for upholstery of the seat. The seat belt webbing having passed through the mounting member 3 and a layer of foam material 6 (see FIG. 2) is then inserted laterally into the escutcheon member 4 by passing the webbing through the slot 4I. It will be appreciated that although the escutcheon member 4 is formed of semi-rigid synthetic plastics materials, the flange 4B and the portion 4A are sufficiently flexible that the slot 4I can be opened sufficiently to enable seat belt webbing to be passed therethrough.

The escutcheon member 4 is then passed through the foam material 6 so that the walls 4D and 4E thereof engage within the aperture 3C of the member 3. The member 3 is shown in broken lines in FIG. 2, and it will be seen that the member 4 can be pushed into the aperture 3C until the free ends of the ribs 4H abut against the edges of the aperture 3C. At this point the external barbs 4G of the walls 4E that had been pressed inwardly during insertion into the aperture 3C now snap into the openings 3F of the member 3 in order to retain the escutcheon member in position. It will be noted that the escutcheon member 4 provides a smooth guide for webbing of a seat belt that passes along a path shown in broken lines at 7 in FIG. 2. Although not shown in detail in the drawings, it will be appreciated that the rectangular opening in the flange 4B and the free ends of the walls 4D have a radius to provide appropriate guide surfaces for the webbing.

The complete seat arrangement including the guide assembly illustrated and the foam cushioning material are enclosed in a glove-like case (not shown) of textile material having an opening to receive the seat belt webbing. The flange 4B of the escutcheon member 4 will thus serve to trim the edges of the textile material that will extend between itself and the foam material 6 shown in FIG. 2.

Although the invention has been described with reference to one particular embodiment, it will be appreciated that alterations and modifications may be made without departing from the scope of the invention. For example, the general concept, of the guide means may be applied to the guiding of flexible elements other than the webbing of seat belts, in which case the relevant apertures in the guide means may be of appropriate cross-section, for example circular when flexible elements such as cables are to be guided.

What is claimed is:

1. A guide assembly for a flexible element comprising:

a mounting member providing an aperture extending along an axis, said mounting member being adapted to be supported from a structural member with respect to which the flexible element is to be guided, and the aperture formed for the flexible element to pass completely through the mounting member;

an escutcheon member for trimming an orifice through which the flexible element is to pass, the escutcheon member being adapted to be received and retained in said aperture of the mounting member to provide a guide aperture for the flexible element extending coaxially with the aperture in the mounting member, and;

the mounting member being divided longitudinally along the axis and along the entire length of the aperture so that the flexible element can be inserted into the aperture therein, through the division and in a direction transversely to said axis;

the escutcheon member also being divided along its entire length for insertion of the flexible member therein when disassembled from the mounting member, surfaces defining the division in the escutcheon member being held in engagement with one another when the escutcheon member is received in said aperture of the mounting member.

2. A guide assembly as claimed in claim 1 configured to guide a seat belt fitted to a vehicle seat, wherein said mounting member is configured to fit to an upper edge of a frame of a seat, proximate to a shoulder level of an occupant of the seat, with the aperture therein extending in a direction from front to rear of the seat and said escutcheon member is fitted within said mounting member and is configured to extend through upholstery of the seat which may enclose the mounting member, to trim an aperture in such upholstery through which the seat belt passes.

3. A guide assembly as claimed in claim 1 wherein said mounting member comprises four adjoining wall portions defining a generally rectangular aperture and is divided between a lower wall portion configured for engaging a seat frame and an adjacent side wall portion, said lower wall portion having an extension beyond said side wall portion and configured for overlying said seat frame and said side wall portion being integral with a further extension overlying said extension of the lower wall portion, said extensions being configured for being secured to a seat frame in facing relationship to close the division in the mounting member.

4. The guide assembly as claimed in claim 3, wherein said mounting member is constructed of folded sheet metal.

5. A guide assembly according to claim 1 further including a divided conduit into which the flexible member can be inserted generally transversely to an elongate passage extending through the conduit said conduit adapted to be mounted with its elongate axis at an angle to the axis of the mounting member so that the flexible member can be guided along an angular path.

6. The guide assembly as claimed in claim 5, wherein said divided conduit is secured at the rear of said seat arrangement to enclose a region of said seat belt extending between said mounting member and a floor anchorage.

7. The guide assembly as claimed in claim 6, wherein said divided conduit is formed from mating sections of extruded synthetic plastics material.

8. A vehicle seat arrangement comprising:

a vehicle seat having a frame and upholstery surrounding the frame;

a flexible member fitted to the vehicle seat;

a mounting member providing an aperture extending along an axis, said mounting member being fitted to an upper edge of the frame of the seat, proximate to the shoulder level of an occupant of the seat, with the aperture therein extending in a direction from front to rear of the seat, the aperture formed for the flexible element to pass completely through the mounting member;

an escutcheon member for trimming an orifice through which the flexible element is to pass, the escutcheon member being adapted to be received and retained in said aperture of the mounting member to provide a guide aperture for the flexible element extending coaxially with the aperture in the mounting member, and said escutcheon member extends through the upholstery of the seat enclosing the mounting member, to trim an aperture in the upholstery through which the seat belt passes;

the mounting member being divided longitudinally along the axis and along the entire length of the aperture so that the-flexible element can be inserted into the aperture therein, through the division and in a direction transversely to said axis;

the escutcheon member also being divided along its entire length for insertion of the flexible member therein when disassembled from the mounting member, surfaces defining the division in the escutcheon member being held in engagement with one another when the escutcheon member is received in said aperture of the mounting member.

9. A vehicle seat arrangement as claimed in claim 8 wherein said mounting member comprises four adjoining wall portions defining a generally rectangular aperture and is divided between a lower wall portion engaging said upper edge of the seat frame and an adjacent side wall portion, said lower wall portion having an extension beyond said side wall portion and overlying said seat frame and said side wall being integral with a further extension overlying said extension of the lower wall portion, said extensions being secured to said seat frames by means that retain them in facing relationship to close the division in the mounting member.

10. The vehicle seat arrangement as claimed in claim 9, wherein said mounting member is constructed of folded sheet metal.

* * * * *